July 15, 1941.  C. PRESS  2,249,227
BRAKE
Filed Feb. 27, 1937  6 Sheets-Sheet 1
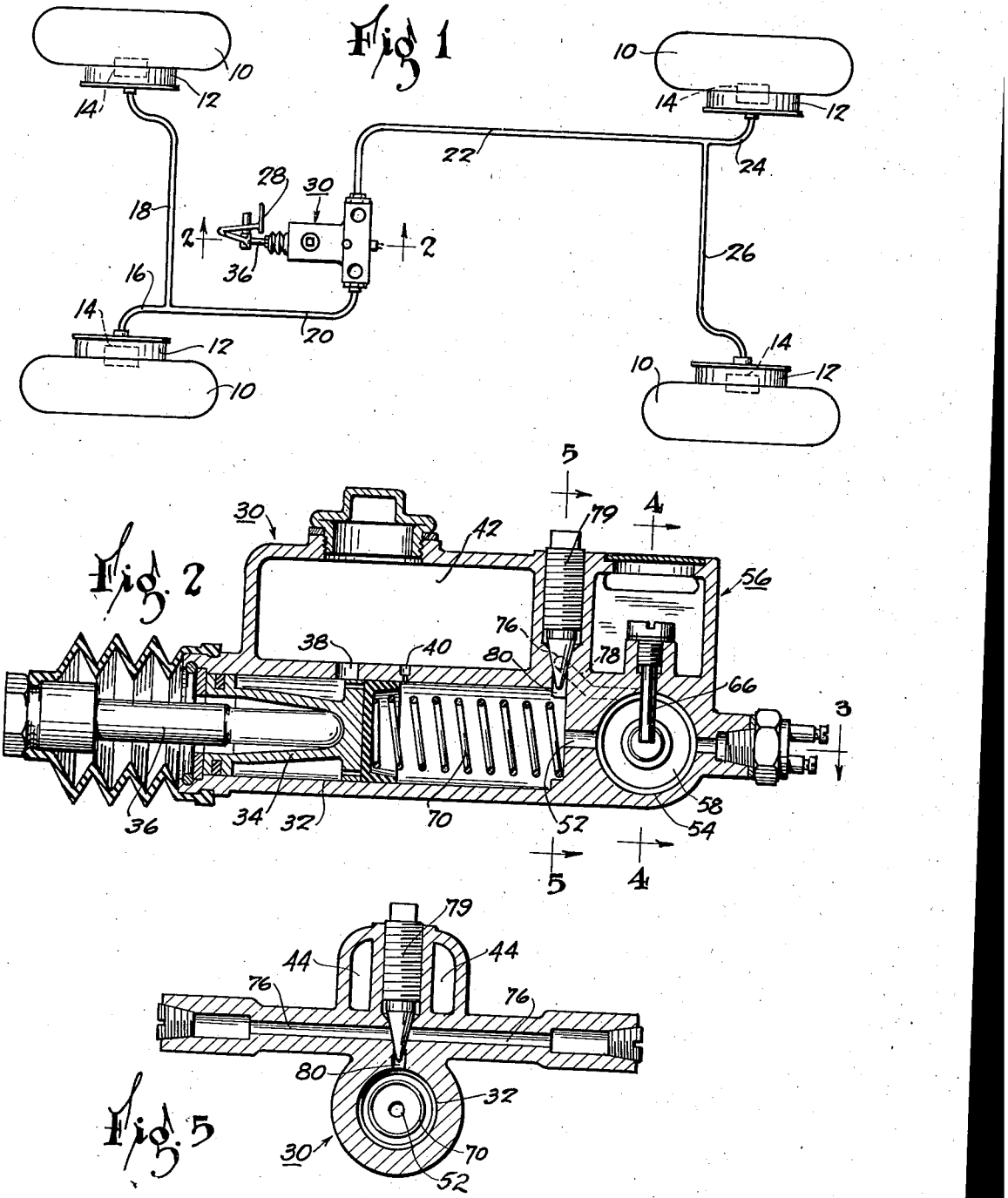
INVENTOR.
CARL PRESS
BY Jerome R. Cox
ATTORNEY.

July 15, 1941.   C. PRESS   2,249,227
BRAKE
Filed Feb. 27, 1937   6 Sheets-Sheet 2
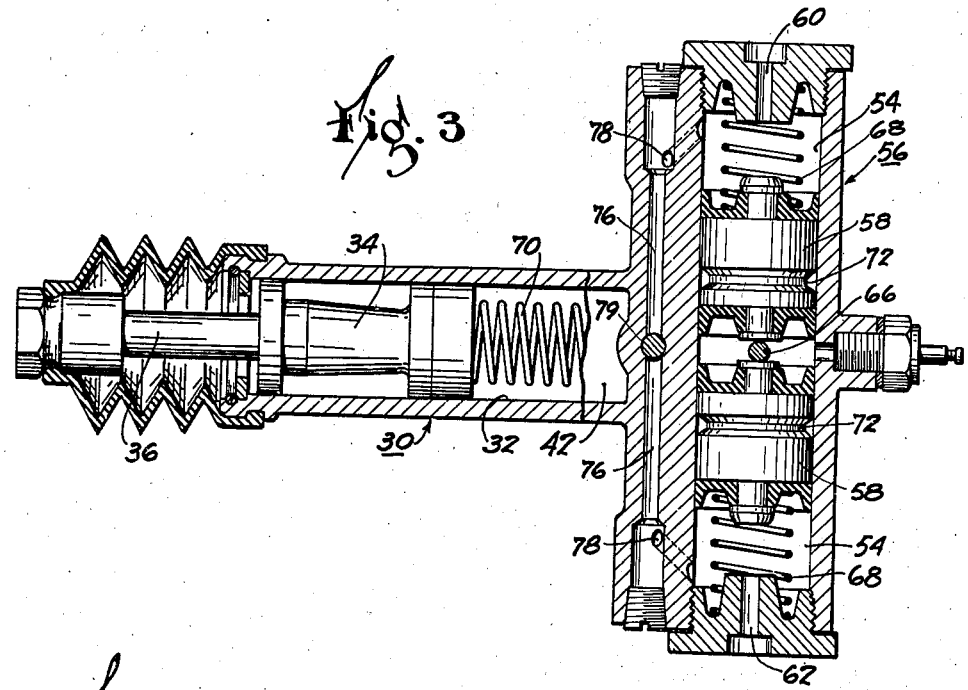
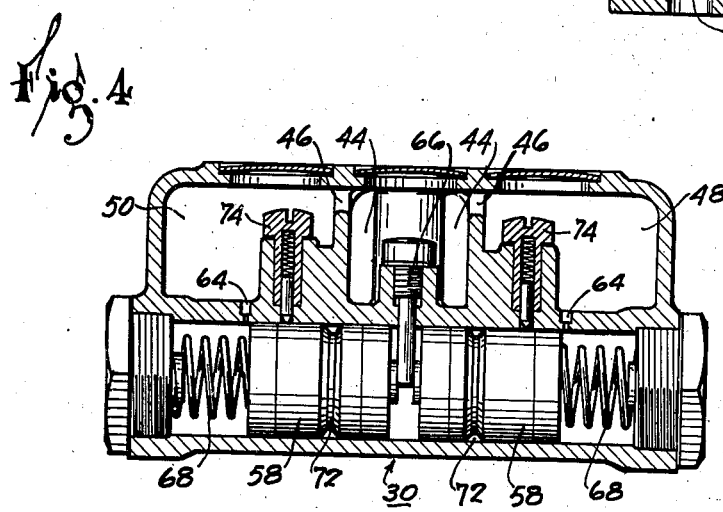
INVENTOR.
CARL PRESS
BY
Jerome N. Cox
ATTORNEY.

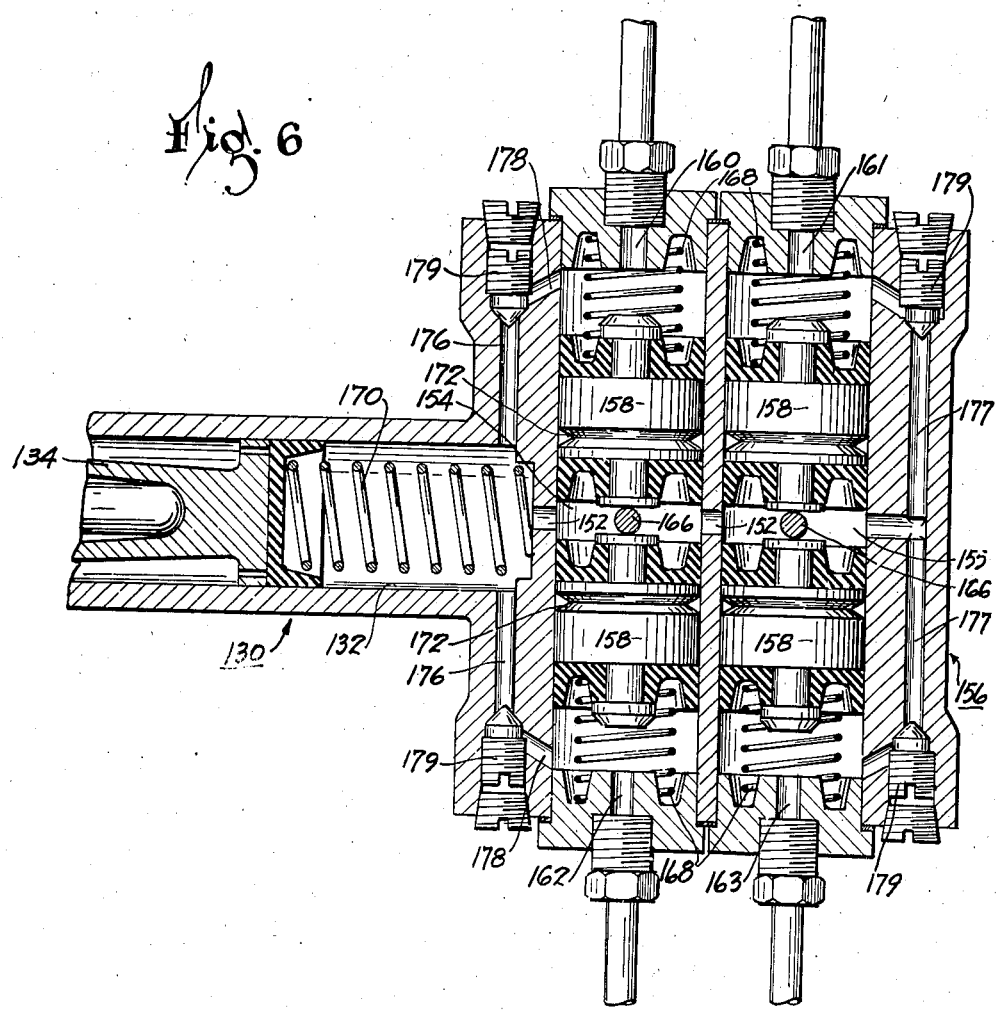

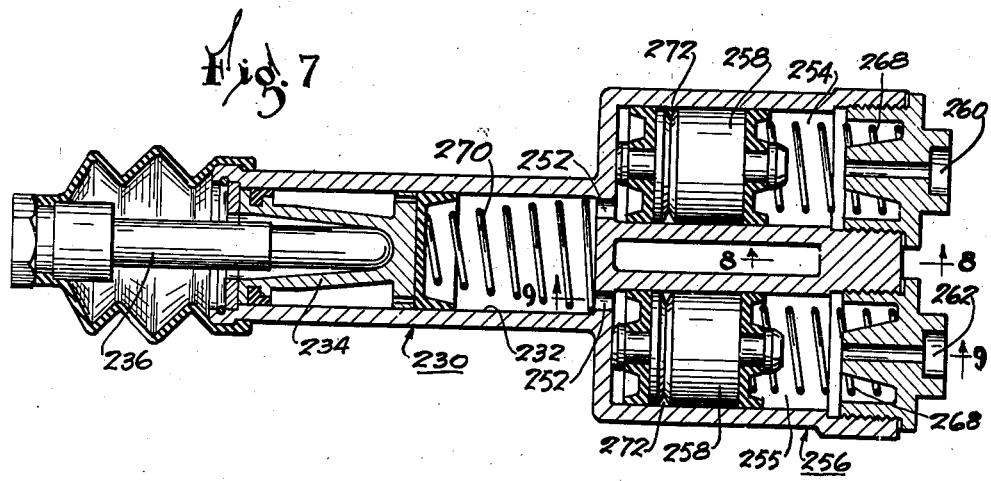
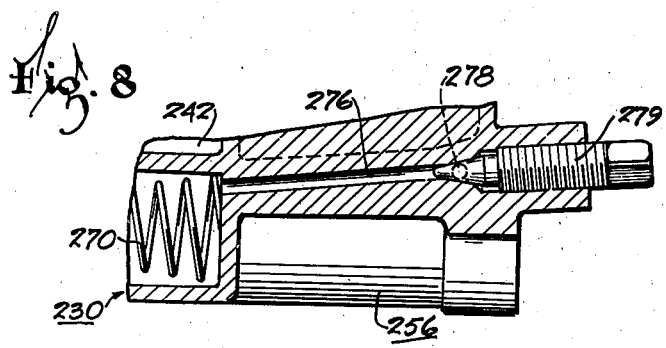
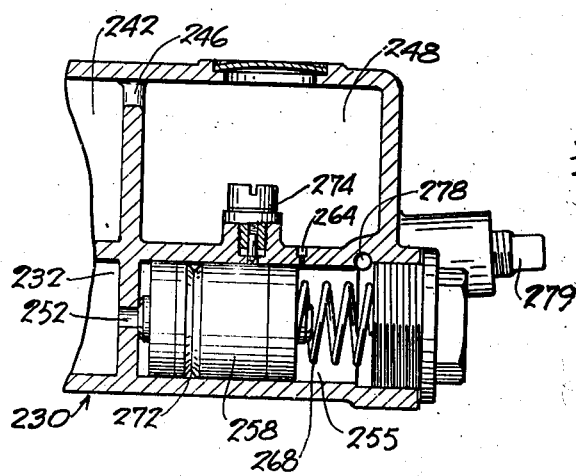

July 15, 1941.  C. PRESS  2,249,227
BRAKE
Filed Feb. 27, 1937   6 Sheets-Sheet 5
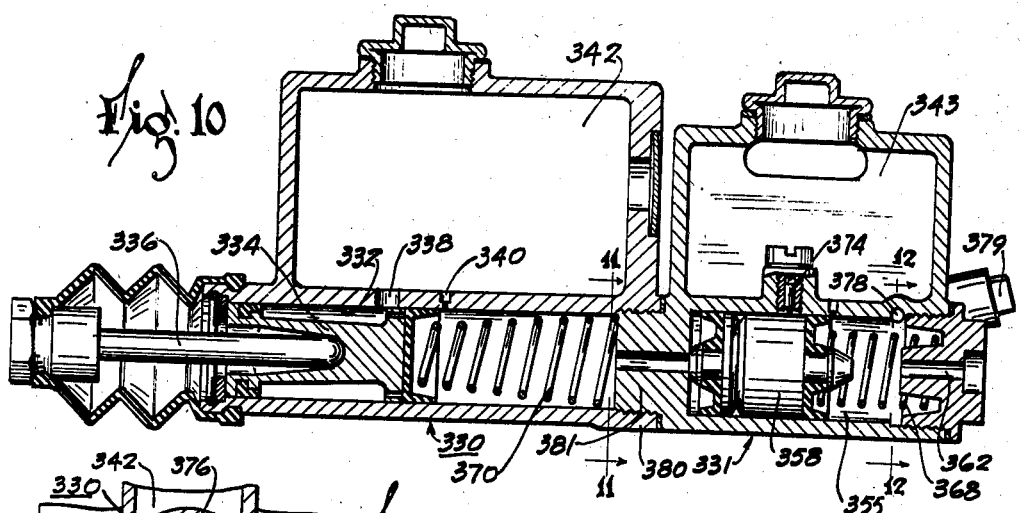
Fig. 10
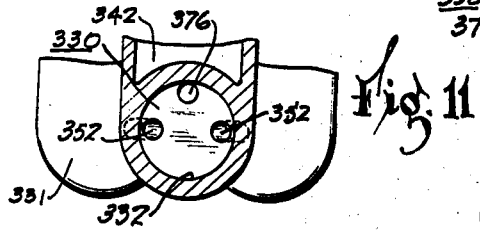
Fig. 11
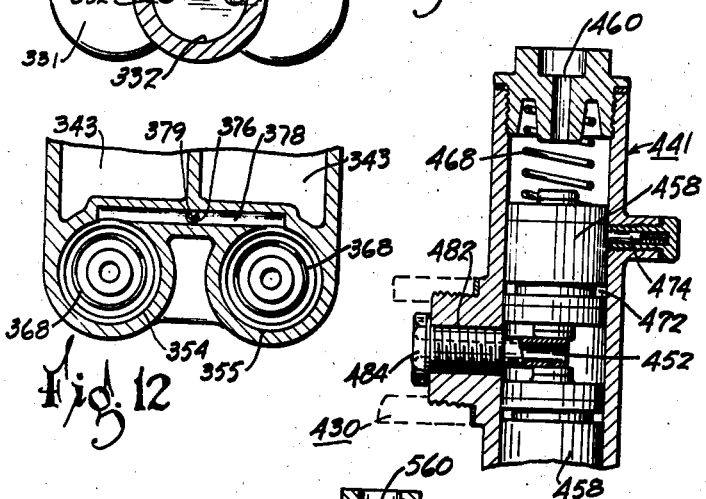
Fig. 12
Fig. 13
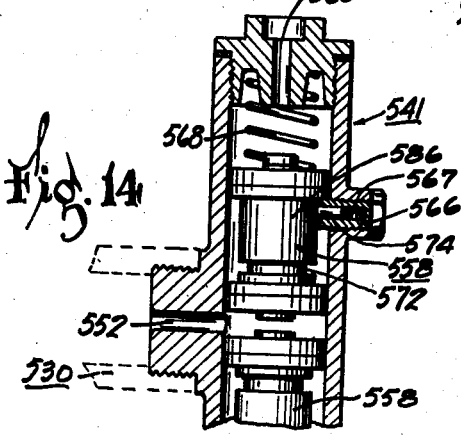
Fig. 14
INVENTOR.
CARL PRESS
BY
Jerome R. Cox
ATTORNEY.

July 15, 1941.   C. PRESS   2,249,227
BRAKE
Filed Feb. 27, 1937   6 Sheets-Sheet 6

INVENTOR.
CARL PRESS
BY Jerome R. Cox
ATTORNEY.

Patented July 15, 1941

2,249,227

UNITED STATES PATENT OFFICE 2,249,227

BRAKE

Carl Press, South Bend, Ind., assignor to Bendix Products Corporation, South Bend, Ind., a corporation of Indiana Application February 27, 1937, Serial No. 128,104

3 Claims. (Cl. 60—54.5)

This invention relates to brakes and is illustrated as a hydraulic brake system.

One of the objects of this invention is to provide a hydraulic brake system so arranged that the brakes may be applied in a conventional manner and without any substantial losses of pedal travel in all ordinary cases, but so arranged that in case of breakage or failure of any single part, at least some of the brakes may be applied notwithstanding the breakage.

A further object of the invention is to provide improved simple means for bleeding such a system and improved simple means for compensating the various portions of the system.

One feature of my invention is the provision of a master cylinder formed with the conventional bore in which the operating piston moves and with a bore connected thereto and provided with pistons to separate the various sections of the hydraulic system from the operating bore.

A further feature of the invention is the provision of a bleeding bore which is normally connected individually to the separated sections and is arranged to be connected upon the withdrawal of a bleed screw with the operating bore.

A further feature of the invention is the provision of a reservoir which is connected by means of compensating ports not only with the operating bore but also with the separated sections.

Further objects and features of the invention will be apparent after a reading of the subjoined specification and claims and after consideration of the accompanying drawings, in which:

Figure 1 is a diagrammatic view of a hydraulic brake system arranged according to my invention;

Figure 2 is a sectional view of the master cylinder of Figure 1 shown on an enlarged scale and taken substantially on the line 2—2 of Figure 1;

Figure 3 is a sectional view taken through the whole cylinder substantially as if on the line 3—3 of Figure 2;

Figure 4 is a sectional view taken through the whole cylinder substantially as if on the line 4—4 of Figure 2;

Figure 5 is a fragmentary sectional view taken through a portion of the cylinder substantially as if on the line 5—5 of Figure 2;

Figure 6 is a sectional view corresponding to a portion of Figure 3 but showing a different form of master cylinder;

Figure 7 is a sectional view corresponding to Figure 3 and showing a still further modification;

Figure 8 is a fragmentary sectional view corresponding to the rearward portion of Figure 2 but showing the master cylinder of Figure 7, and taken substantially on the line 8—8 of Figure 7;

Figure 9 is a fragmentary sectional view taken through a portion of the cylinder substantially as if on the line 9—9 of Figure 7;

Figure 10 is a sectional view corresponding to Figure 2 and showing a still further modification;

Figure 11 is a fragmentary sectional view taken through a portion of the cylinder substantially as if on the line 11—11 of Figure 10;

Figure 12 is a fragmentary sectional view taken through a portion of the cylinder substantially as if on the line 12—12 of Figure 10;

Figure 13 is a fragmentary sectional view corresponding to a portion of Figure 3 and showing a still further modification;

Figure 14 is a fragmentary sectional view corresponding to Figure 13 and showing a still further modification;

Figure 15:
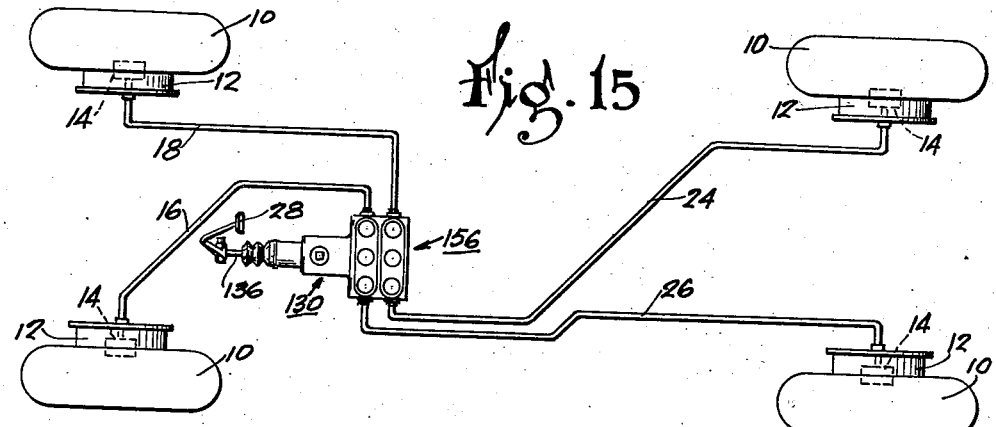
Figure 15 is a view similar to Figure 1 showing the system incorporating the modification shown in Figure 6.
Figure 16:
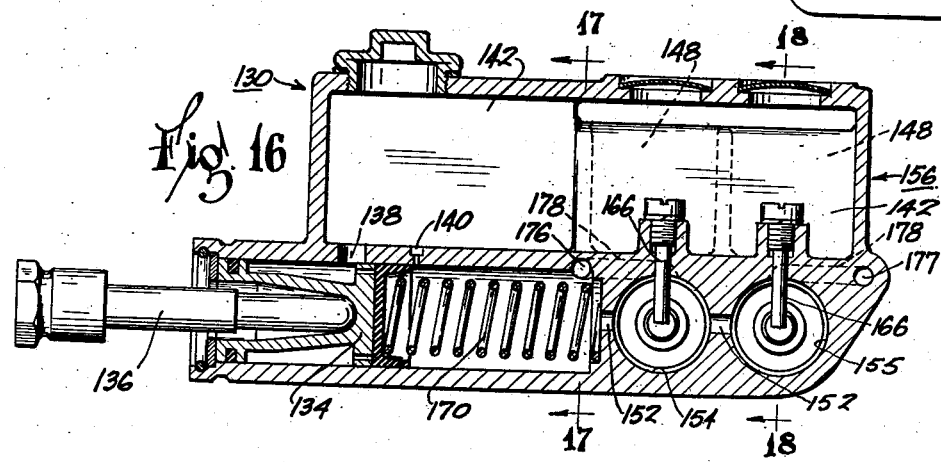
Figure 16 is a view similar to Figure 2 showing the modification of Figure 6.
Figure 17:
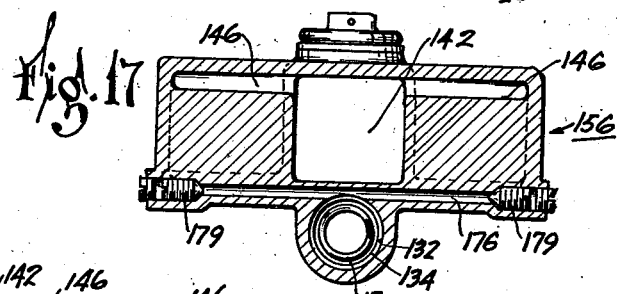
Figure 17 is a view similar to Figure 5 taken substantially on the line 17—17 of Figure 16.
Figure 18:
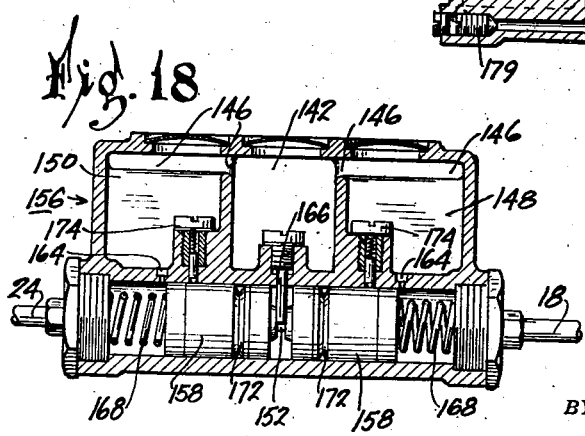
Figure 18 is a view substantially similar to Figure 4 taken on the line 18—18 of Figure 16.

Referring in detail to the drawings, it may be seen that I have shown in Figure 1 diagrammatically a portion of the supporting gear of an automobile together with a hydraulic brake system therefor. There are provided four wheels 10 each equipped with a wheel brake 12 which is arranged to be actuated by wheel cylinder 14. To each of these wheel cylinders fluid may be delivered by conduits 16, 18, 20, 22, 24 and 26. A pedal 28 is arranged to actuate a master cylinder 30 to force fluid through the conduits to the wheel brake cylinders. The master cylinder 30 is shown more in detail in Figures 2 to 5 inclusive and comprises an operating bore 32 in which there is arranged an operating piston 34 operated by a piston rod 36 which is in turn connected to the foot pedal 28. Ports are formed in the wall of the bore 32 designated as ports 38 and 40. These ports are connected to a reservoir 42 which is also connected as by passages 44 and 46 with reservoirs 48 and 50. The bore 32 is connected as by an opening 52 with a cross bore 54 arranged T-shaped in a laterally extending rearward extension of the master cylinder, the lateral extension being designated 56. Positioned in the bore 54 are provided a pair of pistons 58 which are arranged to separate the fluid in the main operating bore of the cylinder from the fluid in the ends of the cross bore 54. From the ends of the cross bore the fluid may be delivered through the ports 60 and 62 to the conduits 22 and 20 respectively.

In Figure 2 the operating piston is shown in its released position and thus it may be seen that the piston 34 is positioned so that the port 40 leading to the reservoir is uncovered. Similarly in Figures 3 and 4 the pistons 58 are shown in their released positions so that (Figure 4) the compensating ports 64 are uncovered. Between the pistons 58 there is provided a pin 66 which serves as a stop to limit the inner position of the pistons 58, the said pistons being normally returned to contact with said pin by springs 68. A spring 70 is provided similarly for returning the piston 34 to its released position. The pistons 58 are provided with grooves 72 with which spring pressed pins 74 are arranged to coact to serve as latches for holding the pistons 58 in their outermost position in the event that the pistons are ever forced to that outermost position. Thus in the event of failure or leak in either the front brakes or the rear brakes the corresponding piston 58 will be forced outward to its outermost limit and will be held there by the spring pressed pins 74 so that on subsequent strokes there will be no loss of pedal travel in applying the remaining brakes. By reason of the ports 64 and the port 40 all portions of the system are normally connected in the released position of the pistons with the reservoir 42. Thus all portions of the system may be compensated for variations in volume of the fluid due to changes of the temperature.

Means are provided for filling the system with fluid in the bleeding operation. As shown in Figures 2, 3 and 5 there is provided in the lateral section 56 a small cross bore 76 which is connected by means of inclined bores 78 with the portions of the system beyond the pistons 58. A plug 79 normally closes off a passageway 80 connected with the bore 32 and normally separates the two ends of the bore 76 from each other. Thus when the plug 79 is screwed in the position shown in Figure 5 for normal operation of the brakes the portions of the system beyond the pistons 58 are in effect separated from each other and from the operating bore 32. However, the plug 79 may be unscrewed to a certain extent for bleeding so that the passages are all connected and all parts of the system are connected with each other. Thereupon the system may be filled with liquid in the usual manner by operation of the piston 34.

In Figure 6 there is shown a modification of the master cylinder in which there are provided separated lines for each of the four wheel brakes. Figure 6 corresponds generally to Figure 3 and the same numerals are used with the addition of 100 as are used in Figures 2 to 5 inclusive. It will be noted, however, that the cylinder 130 shown in Figure 6 has a lateral section 156 which is provided with two auxiliary bores, one designated 154 and the other designated 155. The bore 154 has outlets 160 and 162 and the bore 155 has outlets 161 and 163. Additional pistons 158 are provided for bore 155 and an additional stop pin 166 is also provided for the bore 155. An additional small bore 177 controlled by bleeder screws 179 is also associated with the bore 155.

In Figures 7, 8 and 9 another modified form of cylinder is shown, the modification being designated 230 and the parts being designated by the same numerals as are used in Figures 2 to 5 inclusive with the addition of 200. The extension 256 is, however, formed with a pair of bores 254 and 255 arranged parallel to each other and with their axes parallel to the extended axis of the main cylinder instead of at right angles thereto. The bleed bore 276 extends generally rearward and upward and intersects at its rearward end a right angle bore 278 connected with the bores 254 and 255. The intersection between the bores 276 and 278 is closed except during the bleeding operation by a bleeding screw 279.

In the embodiment shown in Figure 10, the master cylinder proper is designated by the numeral 330 and is of the conventional type. The various elements are designated by the same numerals as those used in Figures 2 to 5 inclusive with the addition of 300. An attachment or auxiliary cylinder 331 is formed separately from the main cylinder 330 and is arranged to be secured thereto having a boss 381 screwed into the rear end of the cylinder 330 as at 380. The auxiliary cylinder 331 is provided with two separate auxiliary reservoirs 343. It has a pair of bores 354 and 355 with pistons 358 in said bores. It is provided with intersecting bores 376 and 378 controlled by a bleed screw 379.

In the arrangement shown in Figure 13, the auxiliary cylinder 441 has pistons 458 with which there are associated latch pins 474. The threaded boss 481 by which the cylinder 441 is threaded into the main cylinder 430 is also threaded internally as at 482 to receive a hollow pin 484. The pin 484 serves not only to allow liquid to pass from the main cylinder 430 into the auxiliary cylinder 441, but also serves to position the return of the pistons 458.

In Figure 14, I have shown an auxiliary cylinder 541 provided with pistons 558, the pistons being each formed intermediate their ends with a reduced portion 586 and with a groove in said reduced portion designated as 572. Pins 566 are formed with recesses 567 in which there are inserted latch pins 574. Thus the pins 566 limit the inward movement of the pistons 558 and the latches 574 are arranged to hold the pistons in their outward positions in event of a break.

In the operation of the various forms of my invention, when released all portions of the systems are connected to the reservoirs. However, when the pistons 34 are moved forward to apply the brakes the ports 40 are cut off and pressure acting on the rear of the pistons 58 move those pistons forward to cut off the ports 64. Fluid ahead of these pistons is forced out through the conduits to apply the brakes. Should a wheel cylinder leak or a conduit break, the piston 58 associated with that portion of the system moves forward until the associated latch pin 74 locks in the groove 72, holding the piston forward. Thereafter the system is again filled as soon as the piston 34 goes back to its released position and future operations of the pedal operate only the other portion of the system.

In bleeding the screw 79 is removed and the portions of the system being interconnected the system is bled in the same way as a conventional master cylinder. That is, since the unseating of the valve constituted by the pin 79 opens passages by-passing around the pistons 58, the usual bleed ports in the wheel cylinders 14 may be opened in the usual manner, and all air removed from the system and the system entirely filled with liquid from the reservoir 42 by repeated depression of the pedal 28, the piston 34 acting as a pump to force the liquid from the reservoir into the system.

It is to be understood that the above-described embodiments of my invention are for the purpose of illustration only and various changes may be made therein without departing from the spirit and scope of the invention.

I claim:

1. A hydraulic brake system comprising a plurality of wheel brakes, motor cylinders for each of said wheel brakes for applying them, separated conduits for conveying fluid under pressure to said motor cylinders, a master cylinder for creating pressure in the fluid used, a reservoir normally connected to the master cylinder, connections by which fluid pressure is transferred from said master cylinder to said separate conduits, and means in said connections for separating the fluid in said master cylinder from the fluid in said conduits, said means comprising pistons formed with a groove and latches associated with said pistons, a main bore in which said pistons move, and means for limiting the return position of said piston, and said latches comprising spring pressed pins extending through bores formed from said reservoir to said main bore, and said limiting means comprising a pin positioned in a bore formed from the reservoir to the main bore.

2. A hydraulic brake system comprising a plurality of wheel brakes, motor cylinders for each of said wheel brakes for applying them, separated conduits for conveying fluid pressure to said motor cylinders, a master cylinder for creating pressure in the fluid used, connections by which fluid pressure is transferred from said master cylinder to said separate conduits, means in said connections comprising pistons and a main bore in which the pistons move for separating the fluid in said master cylinder from the fluid in said conduits, a reservoir for supplying fluid to said master cylinder and at times to said separated conduits, and means for limiting the return position of said pistons comprising a pin positioned in a bore leading from the reservoir to the main bore.

3. A hydraulic brake system comprising a plurality of wheel brakes, motor cylinders for each of said wheel brakes for applying them, separated conduits for conveying fluid pressure to said motor cylinders, a master cylinder for creating pressure in the fluid used, connections by which fluid pressure is transferred from said master cylinder to said separate conduits, means in said connections comprising pistons and a main bore in which said pistons move for separating the fluid in said master cylinder from the fluid in said conduits, a reservoir for supplying fluid to said master cylinder and at times to said separated conduits, means for limiting the return position of said pistons comprising a pin positioned in a bore leading from the reservoir to the main bore, a passage by which said reservoir may be connected with at least one of said separate conduits, and means comprising a plug for normally making said passage ineffective.

CARL PRESS.